(12) United States Patent
Katz et al.

(10) Patent No.: US 10,684,674 B2
(45) Date of Patent: Jun. 16, 2020

(54) TRACKING PORTIONS OF A USER'S FACE UNCOVERED BY A HEAD MOUNTED DISPLAY WORN BY THE USER

(71) Applicant: Facebook Technologies, LLC, Menlo Park, CA (US)

(72) Inventors: Dov Katz, Irvine, CA (US); Michael John Toksvig, Palo Alto, CA (US); Ziheng Wang, Mountain View, CA (US); Timothy Paul Omernick, Foster City, CA (US); Torin Ross Herndon, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 386 days.

(21) Appl. No.: 15/089,447

(22) Filed: Apr. 1, 2016

(65) Prior Publication Data

US 2017/0287194 A1 Oct. 5, 2017

(51) Int. Cl.
*G06F 3/01* (2006.01)
*G02B 27/01* (2006.01)
*G02B 27/00* (2006.01)
*G06K 9/00* (2006.01)
*H04N 5/33* (2006.01)
*G06F 3/03* (2006.01)
*H04N 5/225* (2006.01)
*G06T 7/33* (2017.01)

(52) U.S. Cl.
CPC .......... *G06F 3/011* (2013.01); *G02B 27/0093* (2013.01); *G02B 27/017* (2013.01); *G02B 27/0172* (2013.01); *G02B 27/0176* (2013.01); *G06F 3/012* (2013.01); *G06F 3/0304* (2013.01); *G06K 9/00255* (2013.01); *G06K 9/00281* (2013.01); *G06T 7/33* (2017.01); *H04N 5/2251* (2013.01); *H04N 5/33* (2013.01); *G02B 2027/014* (2013.01); *G02B 2027/0138* (2013.01); *G02B 2027/0187* (2013.01); *G06T 2207/30201* (2013.01)

(58) Field of Classification Search
None
See application file for complete search history.

(56) References Cited

U.S. PATENT DOCUMENTS

8,170,298 B2 * 5/2012 Li ...................... G06K 9/00281
345/441
9,101,279 B2 * 8/2015 Ritchey .................. G16H 40/63
(Continued)

*Primary Examiner* — Hilina K Demeter
(74) *Attorney, Agent, or Firm* — Fenwick & West LLP (57) ABSTRACT

A virtual reality system includes a head-mounted display (HMD) having one or more facial sensors and illumination sources mounted to a surface of the HMD. For example, the facial sensors are image capture devices coupled to a bottom side of the HMD. The illumination sources illuminate portions of a user's face outside of the HMD, while the facial sensors capture images of the illuminated portions of the user's face. A controller receives the captured images and generates a representation of the portions of the user's face by identifying landmarks of the user's face in the captured images and performing other suitable image processing methods. Based on the representation, the controller or another component of the virtual reality system generates content for presentation to the user.

17 Claims, 5 Drawing Sheets

(56) References Cited

U.S. PATENT DOCUMENTS

| | | | |
|---|---|---|---|
| 2004/0101212 A1* | 5/2004 | Fedorovskaya | G06K 9/6293 382/305 |
| 2013/0235045 A1* | 9/2013 | Corazza | G06T 13/40 345/473 |
| 2014/0125789 A1* | 5/2014 | Bond | G02B 27/017 348/77 |
| 2015/0070262 A1* | 3/2015 | Peters | G06F 3/013 345/156 |
| 2016/0025971 A1* | 1/2016 | Crow | G02B 27/0093 345/156 |
| 2016/0216760 A1* | 7/2016 | Trutna | G06F 3/015 |
| 2016/0234475 A1* | 8/2016 | Courchesne | H04N 7/157 |
| 2016/0341959 A1* | 11/2016 | Gibbs | A63F 13/213 |
| 2016/0342828 A1* | 11/2016 | Lee | G06K 9/627 |
| 2016/0353062 A1* | 12/2016 | Ono | H04N 7/142 |
| 2016/0379407 A1* | 12/2016 | Foster | H04N 13/344 345/633 |
| 2017/0091535 A1* | 3/2017 | Yu | G06K 9/00248 |
| 2017/0116468 A1* | 4/2017 | Yang | G06K 9/00248 |

\* cited by examiner

TRACKING PORTIONS OF A USER'S FACE UNCOVERED BY A HEAD MOUNTED DISPLAY WORN BY THE USER

BACKGROUND

The present disclosure generally relates to virtual reality headsets, and more specifically relates to tracking portions of a user's face that are uncovered by a virtual reality headset.

Virtual reality systems typically include a display presenting content to users. For example, many virtual reality, or augmented reality, systems include a head-mounted display including a display element presenting image or video data to a user. Content presented by the virtual reality system depicts objects and users of the system.

For example, many virtual reality systems present graphical representations, or avatars, of users in a virtual environment to facilitate interactions between users. However, in many conventional virtual reality systems, avatars representing users have a single facial expression, such as a default smiling or neutral facial expression. The limited expressions shows by avatars may present users from having a fully immersive experience in a virtual environment.

Including a facial tracking system in a virtual reality system or in an augmented reality system may provide a more immersive interface. However, conventional facial tracking systems typically include a dedicated peripheral, such as a camera, as well as markers positioned on the face of a user being tracked. These markers and the additional peripheral may separate users from the virtual environment provided to the users, and are unsuitable for use in a portable, lightweight, and high-performance virtual reality headset.

SUMMARY

A head-mounted display (HMD) in a virtual reality (VR) system or in an augmented reality (AR) system includes an electronic display presenting content to a user. Additionally, the HMD includes one or more facial sensors and illumination sources coupled to one or more surfaces of the HMD. The illumination sources are positioned to illuminate portions of the user's face that are outside of the HMD, and the facial sensors are configured to capture characteristics of portions of the user's face that are outside of the HMD. For example, the HMD is a rigid body including the display element, and the illumination sources illuminate portions of the user's face outside of the rigid body, while the one or more facial sensors capture characteristics of the portions of the user's face outside of the rigid body.

In various embodiments, the facial sensors are image capture devices configured to capture images of portions of the user's face illuminated by the one or more illumination sources. A controller coupled to the illumination sources and to the facial sensors processes the captured images to identify surfaces of portions of the user's face. For example, the controller identifies a pixel having a maximum brightness from images captured by the image capture devices and identifies a surface of the portion of the user's face including the pixel having the maximum brightness; however, in other embodiments, the controller may identify a surface of the portion of the user's face based on brightnesses of different pixels in images captured by the image capture devices and locations of the facial sensors or illumination sources on the HMD. Additionally, the controller may identify various landmarks of portions of the user's face. A landmark specifies a location of a feature of the user's face. Example features of the user's face include locations of: a nostril of the user, a chin of the user, a cheek of the user, a mouth of the user, or any other suitable feature of the user's face. In various embodiments, the controller identifies a landmark from one or more received images by determining that the one or more images include characteristics associated with the landmark. For example, the controller compares images received from a facial sensor to stored images corresponding to one or more characteristics of the landmark, and identifies the landmark in the received images if the received images have at least a threshold measure of similarity to the stored images. The controller maintains mappings of coordinates of the one or more pixels in images captured by the image capture devices to a landmark. In various embodiments, the controller applies one or more machine learned models to the captured images received from a facial sensor to identify one or more landmarks from the captured images.

Based on images captured by the facial sensors and processing of the images, the controller generates a representation of one or more portions of the user's face. The reconstruction may be two-dimensional or three-dimensional. In one embodiment, the controller retrieves images captured from one or more facial sensors and mappings between coordinates of pixels in images with landmarks of the user's face to generate the reconstruction of the user's face. For example, the controller generates sections of a surface a portion's of the user's face that do not correspond to a mapping by interpolating data between sections of the surface of the portion of the user's face corresponding to stored mappings. The controller may generate content based on the reconstruction and provide the reconstruction to the electronic display in the HMD for presentation to the user. Alternatively, the controller communicates the reconstruction to a virtual reality console (or an augmented reality console) that generates content based on the representation (e.g., a facial expression for an avatar of the user) and communicates the content to the HMD for presentation.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
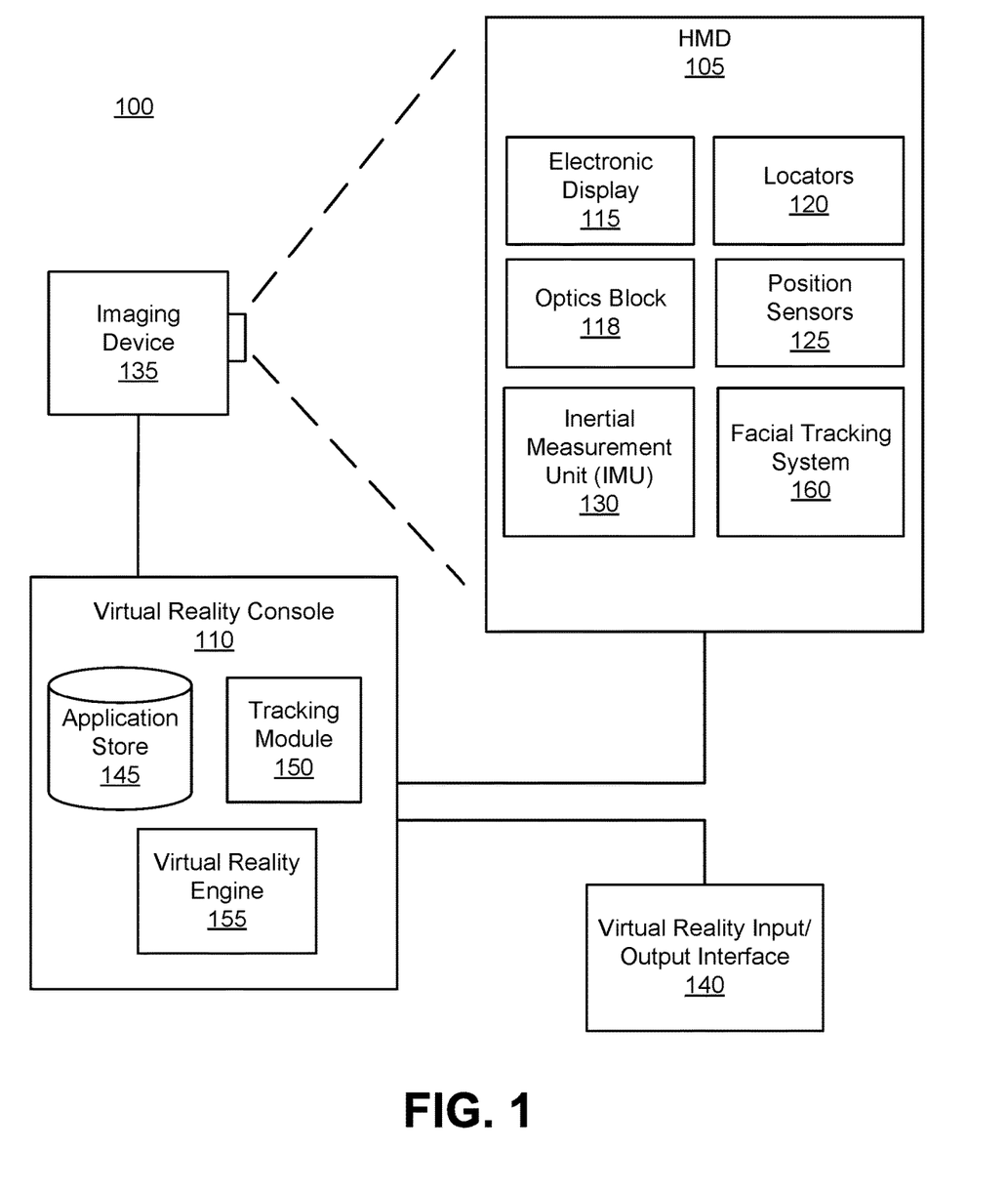
FIG. 1 is a block diagram of a virtual reality or an augmented reality system environment, in accordance with an embodiment.

FIG. 1 is a block diagram of a system environment 100 for providing virtual reality (VR) or augmented reality (AR) content in accordance with an embodiment. The system environment 100 shown by FIG. 1 comprises a head mounted display (HMD) 105, an imaging device 135, and a VR input/output (I/O) interface 140 that are each coupled to a virtual reality (VR) console 110. While FIG. 1 shows an example system environment 100 including one HMD 105, one imaging device 135, and one VR I/O interface 140, in other embodiments, any number of these components are included in the system environment 100. For example, an embodiment includes multiple HMDs 105 each having an associated VR I/O interface 140 and being monitored by one or more imaging devices 135, with each HMD 105, VR I/O interface 140, and imaging device 135 communicating with the VR console 110. In alternative configurations, different and/or additional components may be included in the system environment 100.

The HMD 105 presents content to a user. Examples of content presented by the HMD 105 include one or more images, video, audio, or some combination thereof. In some embodiments, audio is presented via an external device (e.g., speakers and/or headphones) that receives audio information from the HMD 105, the VR console 110, or both, and presents audio data based on the audio information. An embodiment of the HMD 105 is further described below in conjunction with FIGS. 3 and 4. In one example, the HMD 105 comprises one or more rigid bodies, which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The HMD 105 includes an electronic display 115, an optics block 118, one or more locators 120, one or more position sensors 125, an inertial measurement unit (IMU) 130, and a facial tracking system 160. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light from the electronic display 115, corrects optical errors associated with the image light, and presents the corrected image light to a user of the HMD 105. In an embodiment, the optics block 118 includes one or more optical elements and/or combinations of different optical elements. For example, an optical element is an aperture, a Fresnel lens, a convex lens, a concave lens, a filter, or any other suitable optical element that affects the image light emitted from the electronic display 115. In some embodiments, one or more of the optical elements in the optics block 118 may have one or more coatings, such as anti-reflective coatings.

Magnification and focusing of the image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

In an embodiment, the optics block 118 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The HMD 105 may include various locators 120 in some embodiments. The locators 120 are objects located in specific positions on the HMD 105 relative to one another and relative to a specific reference point on the HMD 105. For example, a locator 120 is a light emitting diode (LED), a corner cube reflector, a reflective marker, a type of light source that contrasts with an environment in which the HMD 105 operates, or some combination thereof. In embodiments where the locators 120 are active (i.e., an LED or other type of light emitting device), the locators 120 may emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof.

In some embodiments, the locators 120 are located beneath an outer surface of the HMD 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the HMD 105 relative to an initial position of the HMD 105. For example, the position sensors 125 include multiple accelerometers to measure translational motion (forward/back, up/down, and left/right) and multiple gyroscopes to measure rotational motion (e.g., pitch, yaw, and roll). In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point on the HMD 105. Alternatively, the IMU 130 provides the sampled measurement signals to the VR console 110, which determines the fast calibration data. The reference point is a point describing the position of the HMD 105. While the reference point may generally be defined as a point in space, in practice, the reference point is defined as a point within the HMD 105 (e.g., a center of the IMU 130).

The IMU 130 receives one or more calibration parameters from the VR console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The facial tracking system 160 generates reconstructions of portions of a face of a user wearing the HMD 105, as further described below in conjunction with FIG. 5. In an embodiment, the facial tracking system 160 includes one or more illumination sources, one or more facial sensors, and a controller, as further described below in conjunction with FIG. 2. The light sources and the facial sensors are coupled to the controller that generates a model reconstructing one or more portions of the user's face based on data received from one or more of the facial sensors.

The imaging device 135 generates slow calibration data in accordance with calibration parameters received from the VR console 110. Slow calibration data includes one or more images showing observed positions of the locators 120 that are detectable by the imaging device 135. In some embodiments, the imaging device 135 includes one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input/output (I/O) interface 140 is a device that allows a user to send action requests to the VR console 110 and to receive responses from the VR console 110. An action request is a request to perform a particular action. For example, an action request may be to start or end an application or to perform a particular action within the application. The VR I/O interface 140 may include one or more input devices. Example input devices include: a keyboard, a mouse, a game controller, or any other suitable device for receiving action requests and communicating the received action requests to the VR console 110. An action request received by the VR I/O interface 140 is communicated to the VR console 110, which performs an action corresponding to the action request. In some embodiments, the VR I/O interface 140 may provide haptic feedback to the user in accordance with instructions received from the VR console 110. For example, haptic feedback is provided when an action request is received or when the VR console 110 communicates instructions to the VR I/O interface 140 causing the VR I/O interface 140 to generate haptic feedback when the VR console 110 performs an action.

The VR console 110 provides content to the HMD 105 for presentation to a user in accordance with information received from one or more of: the imaging device 135, the HMD 105, and the VR I/O interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HMD 105 or the VR I/O interface 140. Examples of applications include: gaming applications, conferencing applications, video playback application, or other suitable applications.

The tracking module 150 calibrates the system 100 using one or more calibration parameters and may adjust one or more calibration parameters to reduce error in determination of the position of the HMD 105. For example, the tracking module 150 adjusts the focus of the imaging device 135 to obtain a more accurate position for observed locators 120 on the HMD 105. Moreover, calibration performed by the tracking module 150 also accounts for information received from the IMU 130. Additionally, if tracking of the HMD 105 is lost (e.g., the imaging device 135 loses line of sight of at least a threshold number of the locators 120), the tracking module 140 re-calibrates some of or the entire system environment 100, The tracking module 150 tracks movements of the HMD 105 using slow calibration information from the imaging device 135. The tracking module 150 determines positions of a reference point of the HMD 105 using observed locators 120 on the HMD 105 from the slow calibration information and a model of the HMD 105. The tracking module 150 also determines positions of a reference point of the HMD 105 using position information from the fast calibration information. Additionally, in some embodiments, the tracking module 150 uses portions of the fast calibration information, the slow calibration information, or some combination thereof, to predict a future location of the HMD 105. The tracking module 150 provides the estimated or predicted future position of the HMD 105 to the VR engine 155.

The VR engine 155 executes applications within the system environment 100 and receives position information, acceleration information, velocity information, predicted future positions, or some combination thereof of the HMD 105 from the tracking module 150. Based on the received information, the VR engine 155 determines content to provide to the HMD 105 for presentation to a user. For example, if the received information indicates that the user has looked to the left, the VR engine 155 generates content for the HMD 105 that mirrors the user's movement in a virtual environment. Additionally, the VR engine 155 performs an action within an application executing on the VR console 110 in response to an action request received from the VR I/O interface 140 and provides feedback to the user that the action was performed. For example, the provided feedback includes visual or audible feedback via the HMD 105 or haptic feedback via the VR I/O interface 140.

Facial Tracking System

Figure 2:
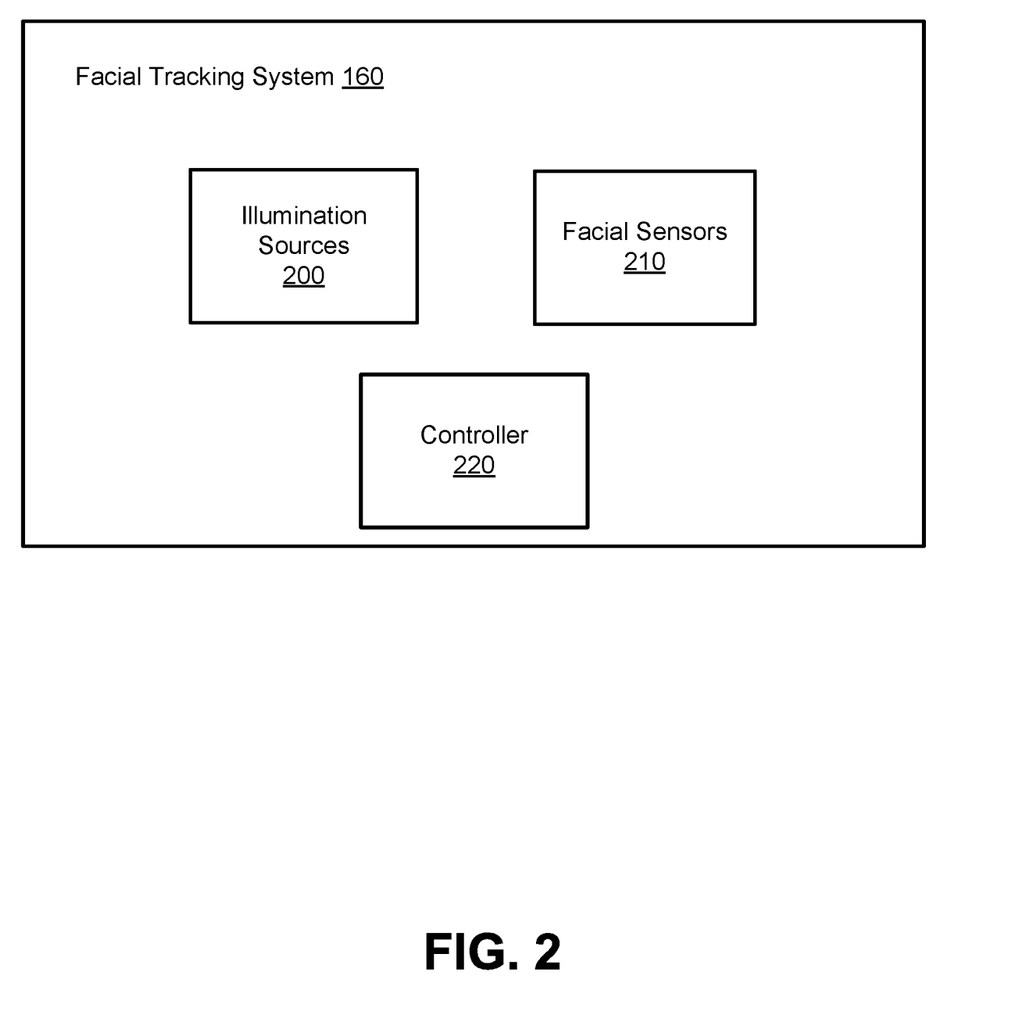
FIG. 2 is a block diagram of a facial tracking system of the virtual reality or the augmented reality system, in accordance with an embodiment.

FIG. 2 is a block diagram of one embodiment of a facial tracking system 160 of the system environment 100 for VR or AR. In the example shown in FIG. 2, the facial tracking system 160 includes one or more illumination sources 200, one or more facial sensors 210, and a controller 220. In other embodiments, different and/or additional components may be included in the facial tracking system 160.

One or more illumination sources 200 are coupled to one or more surfaces of the HMD 105 and are positioned to illuminate a portion of a user's face that is not behind the HMD 105. Illumination sources 220 are positioned at discrete locations along the HMD 105. In some embodiments, the one or more illumination sources 200 are coupled to one or more exterior surfaces of the HMD 105. The illumination sources 200 may be light-emitting diodes (LEDs) that emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof. In some embodiments, different illumination sources 200 have different characteristics. For example, each illumination source 200 has different characteristics, or different sets of illumination sources 200 have different characteristics. As an example, different illumination sources 200 emit light having different wavelengths or different temporal coherences describing correlation between light waves at different points in time. Further, light emitted by different illumination sources 200 may be modulated at different frequencies or amplitudes (i.e., varying intensity) or multiplexed in a time domain or in a frequency domain.

The facial sensors 210 capture images of portions of a face of a user of the HMD 105 by capturing light reflected by the portions of the user's face. In various embodiments, the facial sensors 210 comprise one or more image capture devices, such as cameras, positioned to capture light from one or more illumination sources 200 reflected by portions of the user's face over a range of movements of the portion of the user's face; however, in other embodiments the facial sensors 210 may be depth sensors or may be a combination of depth sensors and image capture devices. Facial sensors 210 used in various embodiments depend on types of illumination sources 200 used in the embodiments. For example, if the facial tracking system 160 includes illumination sources 200 emitting IR light (e.g., IR light emitting diodes), the facial sensors 210 are configured to detect infrared light (e.g., infrared cameras). The facial sensors 210 have plurality of parameters such as focal length, focus, frame rate, ISO, sensor temperature, shutter speed, aperture, resolution, etc. In some embodiments, the facial sensors 210 have a high frame rate and high resolution. The facial sensors 210 can capture two-dimensional images and/or three-dimensional images.

In various embodiments, one or more facial sensors 210 are non-optical sensors that capture information describing characteristics of portions of the user's face. Example non-optical sensors for use as a facial sensor 210 include: an audio sensor, a strain gauge, an electric sensor, a magnetic sensor, a proximity sensor, or any other sensor capturing non-optical data. Hence, in various embodiments, the one or more facial sensors 210 may comprise image capture devices, non-optical sensors, or a combination of image capture devices and non-optical sensors.

The controller 220 is coupled to the illumination sources 200 and to the facial sensors 210 and communicates instructions to one or more of the illumination sources 200 and to one or more of the facial sensors 210. Instructions from the controller 220 to an illumination source 200 cause the illumination source 200 to emit light illuminating portions of a face of the user. Additionally, instructions from the controller 220 to a facial sensor 210 cause the facial sensor 210 to capture one or more images of the illuminated portions of the user's face or to capture other data describing characteristics of portions of the user's face. In an embodiment, the controller 220 stores captured data describing characteristics of portions of the user's face (e.g., images of portions of the user's face illuminated by the one or more illumination sources 200) in a storage device accessible by the controller 220.

In some embodiments, the controller 220 communicates instructions to different illumination sources 200 to coordinate emission of light by different illumination sources 200. For example, the controller 220 communicates instructions to the one or more illumination sources 200 so a single illumination source 200 emits light at a given time, allowing different portions of a portion of the user's face to be illuminated at different times. In some embodiments, the controller 220 modifies an order in which illumination sources 200 emit light over time or provide instructions to illumination sources 200 causing the illumination sources to emit light at random times. Instructions provided from the controller 220 to an illumination source 200 may also specify a frequency at which the illumination source 200 illuminates a portion of the user's face.

Additionally, the controller 220 provides instructions to the one or more facial sensors 210 to capture data describing characteristics of portions of the user's face. For example, instructions provided to a facial sensor 210 from the controller 220 cause the facial sensor 210 to capture an image of a portion of the user's face during a time when an illumination source 200 illuminates the portion of the user's face. Hence, a facial sensor 210 may capture an image of a portion of the user's face corresponding to a time when an illumination source 220 illuminated the portion of the user's face. In other embodiments, instructions provided by the controller 220 to a facial sensor 210 identify times and durations when the facial sensor 210 captures data describing characteristics of a portion of the user's face.

For example, the one or more facial sensors 210 are deformation sensors in direct or indirect contact with various different locations on portions of the user's face. For example, a liner is coupled to a periphery of the HMD 105 and configured to directly or indirectly contact portions of the user's face. Deformation sensors are attached along the liner and configured to measure deformations of the liner caused by movement of portions of the user's face while the user is wearing the HMD 105. In one embodiment, the deformation sensors are strain gauges that translate muscle movements of portions of the user's face to changes in the bending strain and radius of curvature on the surface of the strain gauges. Based on signals from the deformation sensors, the controller 200 generates a reconstruction of portions of the user's face while the user uses the HMD 105. Use of deformation sensors to generate a reconstruction of one or more portions of a user's face is further described in U.S. patent application Ser. No. 14/964,467, filed on Dec. 9, 2015, which is hereby incorporated by reference in its entirety.

Based on images or other data describing characteristics of one or more portions of the user's face from the one or more facial sensors 210, the controller 220 generates a reconstruction of the portions of the user's face. If one or more facial sensors 210 capture images of portions of the user's face, the controller processes the captured images and generates the reconstruction of portions of the user's face from the processed images. For example, light from an illumination source 200 reflected from a portion of the user's face is brightest (e.g., as measured in lumens for visible light) when an angle of incidence of the light from the illumination source 200 onto the portion of the user's face equals an angle of reflection of the light by the portion of the user's face. Thus, in an image including a plurality of pixels captured by a facial sensor 210, the brightest pixel corresponds to a specific surface of the face of the user that has a particular position relative to the illumination source 200. As another example, when an image from a facial sensor 210 represents different pixels using the red green blue (RGB) color model, the controller 220 identifies a pixel from the image having a RGB value most closely matches # FFFFFF, white, as a brightest pixel of the image. However, any suitable image processing technique may be used by the controller to identify a brightest pixel of an image received from a facial sensor 210. In some embodiments, the controller 220 preprocesses images captured by a facial sensor 210 using one or more noise reduction methods to more accurately determine brightness of pixels in the image. For example, if an image from a facial sensor 210 has less than a threshold brightness or greater than an alternative threshold brightness, the controller applies an image brightness offset correction or an image filter to the image to more accurately identify a pixel in the image having a maximum brightness. However, in other embodiments, the controller 210 may identify a surface of the portion of the user's face based on brightnesses of different pixels in images captured by the image capture devices and locations of the facial sensors 210 or illumination sources 200 on the HMD 105, when the facial sensors 200 or illumination sources 200 have fixed positions on the surface of the HMD 105.

If a facial sensor 210 has a fixed position on a surface the HMD 105 and illumination sources 200 are positioned at different discrete positions on one or more surfaces of the HMD 105, different illumination sources 200 correspond to different sections of a portion of the user's face. In such an embodiment, each illumination source 200 corresponds to a particular section of the portion of the user's face where an angle of incidence of light emitted from the illumination source 200 onto the particular section of the portion of the user's face equals an angle of reflection of the light by the particular section of the portion of the user's face. Hence, processing images captured by the facial sensor 210 allows the controller 220 to map captured images or illumination sources 200 to different sections of the portion of the user's face. For example, sections of a portion of the user's face include: portions of the user's chin, a left or a right nostril of the user, portions of a cheek of the user, portions of a mouth of the user, or other regions of a face of the user.

In various embodiments, based on images received from one or more facial sensors 210, the controller 220 identifies various landmarks of portions of the user's face. A landmark specifies a location of a feature of the user's face. Example features of the user's face include locations of: a nostril of the user, a chin of the user, a cheek of the user, a mouth of the user, or any other suitable feature of the user's face. The controller 220 identifies a landmark from one or more received images by determining that the one or more images include characteristics associated with the landmark. For example, the controller 220 compares images received from a facial sensor 210 to stored images corresponding to one or more characteristics of the landmark, and identifies the landmark in the received images if the received images have at least a threshold measure of similarity to the stored images. In various embodiments, the controller 220 applies one or more machine learned models to the captured images received from a facial sensor 210 to identify one or more landmarks from the captured images. As a particular example, the controller 220 compares images received from the facial sensor 210 to stored images corresponding to a mouth forming a smile and identifies images from the facial sensor 210 with a threshold measure of similarity to the stored images as images from the facial sensor 210 including the user's mouth forming a smile. If the facial sensors 210 include one or more non-optical sensors, the controller 220 compares characteristics from the non-optical sensors to stored characteristics associated with a landmark to identify whether the characteristics correspond to the landmark. In some embodiments, the controller 220 determines changes in brightness of one or more pixels over a series of images (as moving portions of the user's face change brightness of light reflected by the portions of the user's face), determines coordinates of the one or more pixels in the series of images, and maps the determined coordinates to a landmark. The controller 220 stores mappings between coordinates of pixels in images from the facial sensor 210 and the landmark in association with an identifier of the user, allowing subsequent retrieval of the mappings between the coordinates of pixels in the images from the facial sensor 210 and the landmark. In various embodiments, the controller 220 stores the mappings in association with the identifier of the user in a local storage device, but may store the mappings in any suitable storage device accessible to the controller 220.

The controller 220 may communicate with the electronic display 115 in the HMD 105 to prompt the user to perform a series of facial expressions to generate calibration data to map coordinates of pixels in images from one or more facial sensors 210 with one or more landmarks. In various embodiments, the electronic display 115 prompts the user to perform different facial expressions at different times, so images (or other characteristics) captured by a facial sensor 210 during a particular time interval correspond to a particular facial expression, allowing the controller 220 to map coordinates of pixels in the images (or coordinates corresponding to captured characteristics) to a landmark when the user performs the particular facial expression. Information identifying the mapping of coordinates of pixels in the images (or coordinates of characteristics) to the landmark in association with an identifier of the user and an identifier of the particular facial expression is then stored by the controller 220.

In some embodiments, the controller communicates the mapping between coordinates of pixels in images to one or more landmarks to the VR console 110, which may maintain a set of calibration data captured for various users; the VR console 110 may communicate calibration data to a server that maintains calibration data for users of multiple HMDs 105 in some embodiments. Alternatively, the controller 220 determines changes in brightness of one or more pixels over a series of images, determines coordinates of the one or more pixels in the series of images, and maps the determined coordinates to a landmark without prompting the user to perform one or more facial expressions. Hence, the controller 220 may capture calibration data for a user as the user interacts with content provided to the user by the HMD 105.

Based on the data for the user, such as the calibration data, the controller 220 generates a reconstruction of the portions of the user's face for which characteristics are obtained by the one or more facial sensors 210. The reconstruction may be two-dimensional or three-dimensional. In one embodiment, the controller 220 retrieves images captured from one or more facial sensors 210 and mappings between coordinates of pixels in images with landmarks of the user's face to generate the reconstruction of the user's face. In various embodiments, the controller 220 aggregates information from the retrieved images and mappings to generate a reconstruction for one or more portions of the user's face for which the one or more facial sensors 210 capture characteristics. For example, the retrieved mappings include mappings between different illumination sources 200 and different portions of the user's face (e.g., a left nostril, a right nostril, a chin, sections of a mouth, etc.). The reconstruction is a graphical representation of portions of the user's face that includes surfaces corresponding to one or more surfaces of each of the portions (or of a set of the portions). In an embodiment, the controller 220 generates sections of a surface a portion's of the user's face that do not correspond to a mapping by interpolating data between sections of the surface of the portion of the user's face corresponding to stored mappings determined by the controller 220.

The controller 220 provides the reconstruction of the portions of the user's face to the electronic display 115 for presentation to the user of the HMD 105. Alternatively, the controller 220 communicates the reconstruction of the portions of the user's face to the VR console 110, which accounts for the reconstruction when generating content provided to the HMD 105 for presentation to the user via the electronic display 115. For example, the VR console 110 modifies a virtual representation of the user's face based on the reconstruction from the controller 220, allowing the virtual representation of the user's face to be updated based on changes to the user's facial expression identified by the controller 220 and described in the reconstruction of the portions of the user's face generated by the controller 220.

Head Mounted Display

Figure 3:
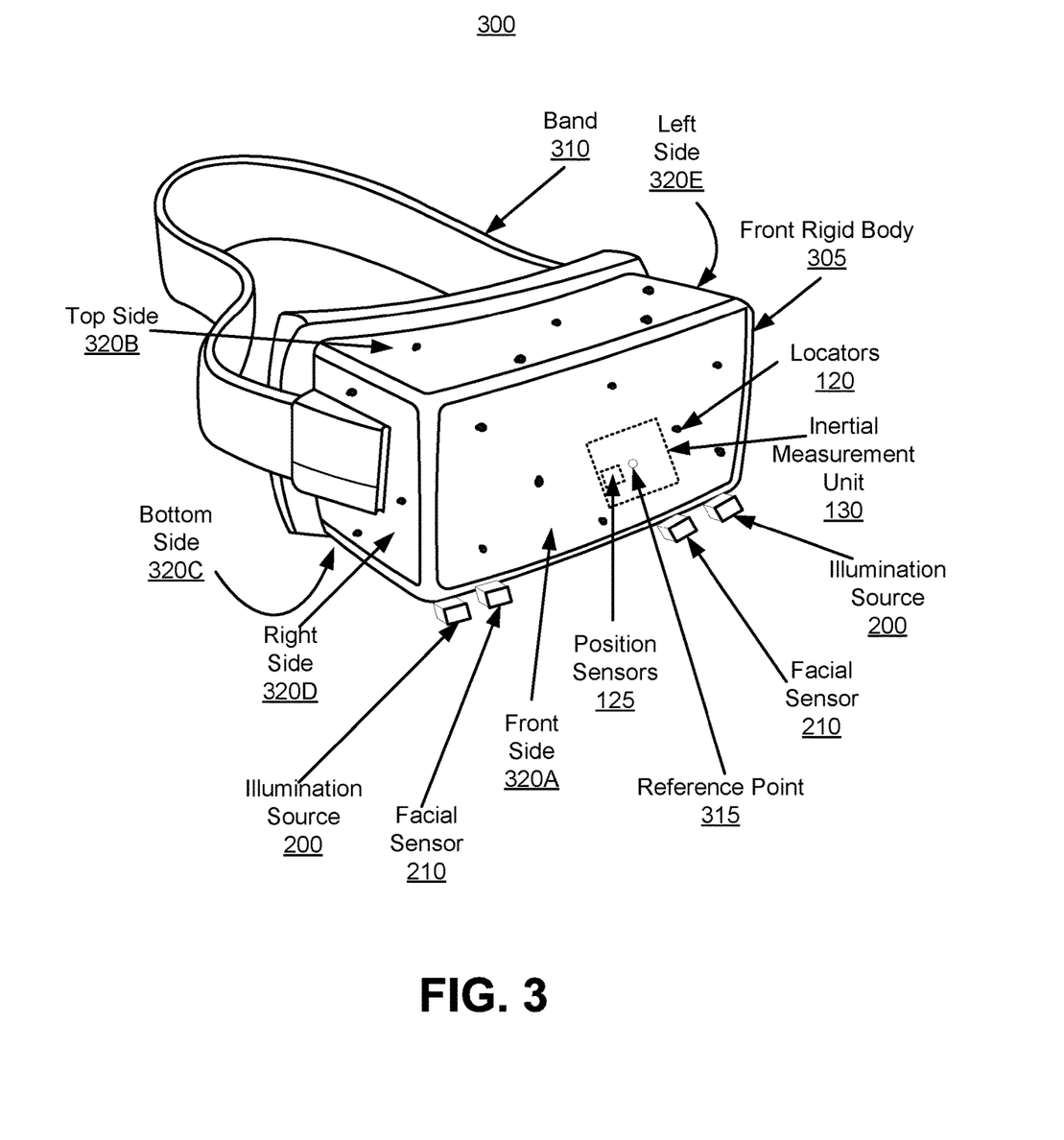
FIG. 3 is a wire diagram of a virtual reality head mounted display, in accordance with an embodiment.

FIG. 3 is a wire diagram of one embodiment of a HMD 300. The HMD 300 shown in FIG. 3 is an embodiment of the HMD 105, and includes a front rigid body 305 and a band 310. The front rigid body 305 includes the electronic display 115 (not shown in FIG. 3), the IMU 130, the one or more position sensors 125, and the locators 120. In the embodiment shown by FIG. 3, the position sensors 125 are located within the IMU 130, and neither the IMU 130 nor the position sensors 125 are visible to the user.

The locators 120 are located in fixed positions on the front rigid body 305 relative to one another and relative to a reference point 315. In the example of FIG. 3, the reference point 315 is located at the center of the IMU 130. Each of the locators 120 emit light that is detectable by the imaging device 135. Locators 120, or portions of locators 120, are located on a front side 320A, a top side 320B, a bottom side 320C, a right side 320D, and a left side 320E of the front rigid body 305 in the example shown in FIG. 3.

In the example of FIG. 3, the HMD 300 includes illumination sources 200 and facial sensors 210 coupled to the bottom side 320A of the HMD 300. For example, an illumination source 200 is coupled to the bottom side 320C of the HMD 300 proximate to the right side 320D of the HMD 300, and another illumination source 200 is coupled to the bottom side 320C of the HMD 300 proximate to the left side 320E of the HMD 300. A facial sensor 210 captures characteristics of portions of the user's face illuminated by the illumination source 200 proximate to the right side 320D of the HMD 300, while another facial sensor 210 captures characteristics of portions of the user's face illuminated by the illumination source 200 proximate to the left side 320E of the HMD 300. While FIG. 3 shows an embodiment with two illumination sources 200 and two facial sensors 210, any number of facial sensors 210 and illumination sources 200 may be included in various embodiments. Additionally, numbers of illumination sources 200 and numbers of facial sensors 210 may differ from each other in various embodiments (e.g., some embodiments have a greater number of illumination sources 220 than facial sensors 210, some embodiments have a greater number of facial sensors 210 than illumination sources 220). In some embodiments, the facial sensors 210 are image capture devices (e.g., cameras) capturing images of the illuminated portions of the user's face. However, the facial sensors 210 may be non-optical devices in some embodiments configured to capture other characteristics describing portions of the user's face. Example non-optical sensors used as a facial sensor 210 include: an audio sensor, a strain gauge, an electric sensor, a magnetic sensor, a proximity sensor, or any other sensor capturing non-optical data. In various embodiments, the HMD 300 may include a set of facial sensors 210 that are non-optical sensors and another set of facial sensors 210 that are image capture devices or other optical sensors.

Figure 4:
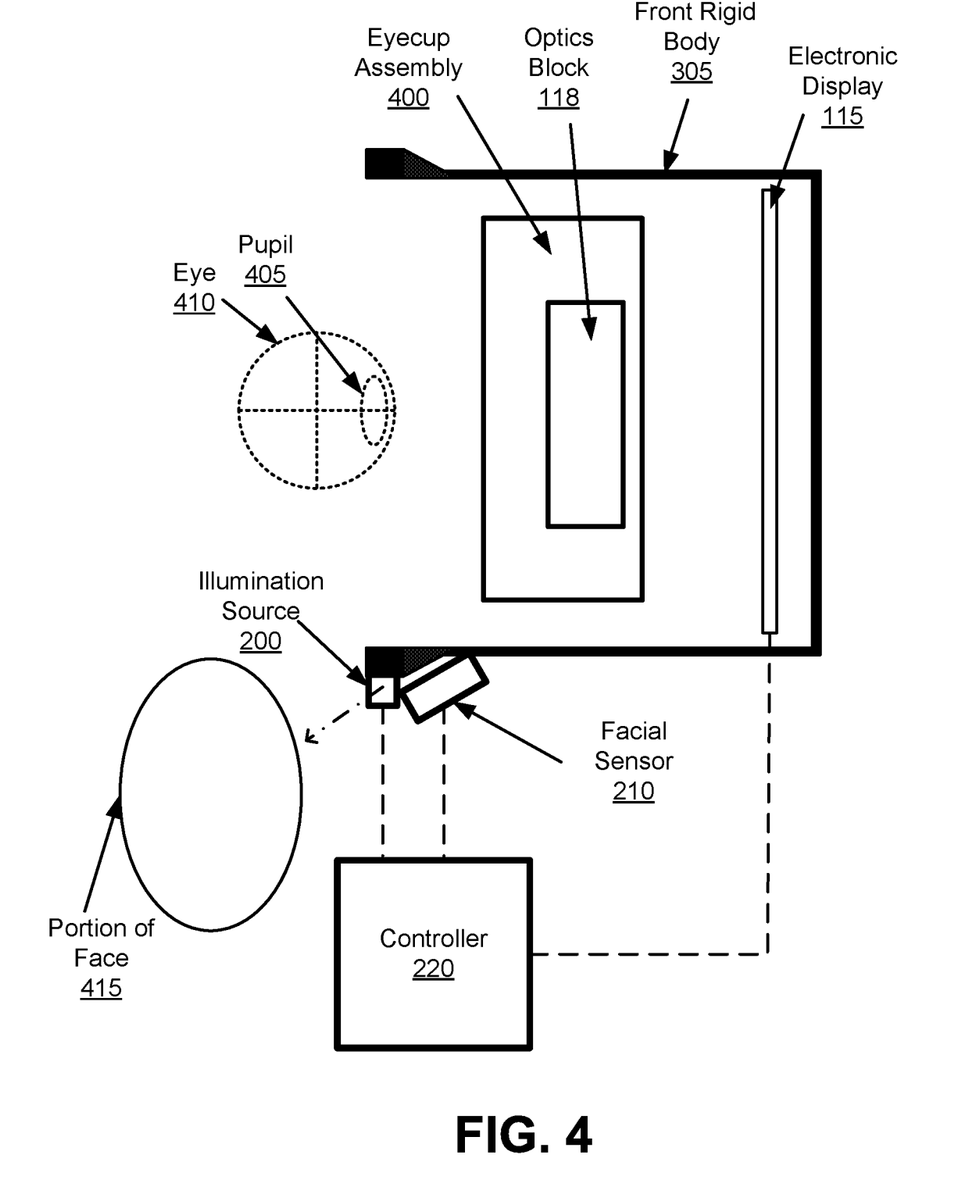
FIG. 4 is a cross section of the front rigid body of the virtual reality head mounted display in FIG. 3, in accordance with an embodiment.

FIG. 4 is a cross-sectional diagram of an embodiment of the front rigid body 305 of the HMD 300 shown in FIG. 3. In the embodiment shown in FIG. 4, the front rigid body 305 includes an eyecup assembly 400, an illumination source 200, a facial sensor 210, an optics block 118, and an electronic display 115. While FIG. 4 shows a single eyecup assembly 400 for a single eye 410 of the user, another eyecup assembly is included in the front rigid body 305 for another eye of the user; hence, the front rigid body 305 includes an eyecup assembly 400 for each of a user's eyes. The illumination source 200 and the facial sensor 210 are coupled to a bottom side of the front rigid body 305 in the example shown by FIG. 4, with the illumination source 200 configured to illuminate a portion 415 of the user's face and the facial sensor 210 configured to capture images of light reflected by the portion 415 of the user's face. For purposes of illustration, FIG. 4 shows a single illumination source 200 and a single facial sensor 210; however, in various embodiments, any suitable number of illumination sources 200 and facial sensors 210 may be coupled to the front rigid body 305. For example, the illumination source 200 and the facial sensor 210 are proximate to a right side of the front rigid body 305, while an additional illumination source 200 and an additional facial sensor 210 are proximate to a left side of the front rigid body 305. While FIG. 4 shows the illumination source 200 and the facial sensor 210 coupled to an exterior surface of the front rigid body 305, in some embodiments the illumination source 200 or the facial sensor 210 are coupled to an interior surface of the front rigid body 305, which is transparent to or does not substantially attenuate wavelengths of light emitted and captured, respectively, by the illumination source 200 and by the facial sensor 210.

The front rigid body 305 includes an optical block 118 that magnifies image light from the electronic display 115, and in some embodiments, also corrects for one or more additional optical errors (e.g., distortion, astigmatism, etc.) in the image light from the electronic display 115. The optics block 118 directs the image light from the electronic display 115 to a pupil 405 of the user's eye 410 by directing the altered image light to an exit pupil of the front rigid body 305 that is a location where the user's eye 410 is positioned when the user wears the HMD 300. For purposes of illustration, FIG. 4 shows a cross section of the right side of the front rigid body 305 (from the perspective of the user) associated with a single eye 410, but another optical block, separate from the optical block 118, provides altered image light to another eye (i.e., a left eye) of the user. The controller 220 is communicatively coupled to the electronic display 115, allowing the controller 220 to provide content for to the electronic display 115 for presentation to the user (e.g., a reconstruction of one or more portions 415 of the user's face based on data captured by the facial sensor 210). Additionally or alternatively, the controller 220 is communicatively coupled to the VR console 110 and communicates reconstructions of one or more portions 415 of the user's face to the VR console 110, which includes one or more reconstructions in content provided to the electronic display 115, or generates content for presentation by the electronic display 115 based at least in part on the one or more reconstructions from the controller 220. Additionally, the controller 220 is communicatively coupled to the illumination sources 200 and facial sensors 210, allowing the controller 220 to provide instructions to the illumination sources 220 and to the facial sensors 210 to illuminate and to capture characteristics (e.g., images) of the portion 415 of a face of the user, as further described above in conjunction with FIG. 2.

Figure 5:
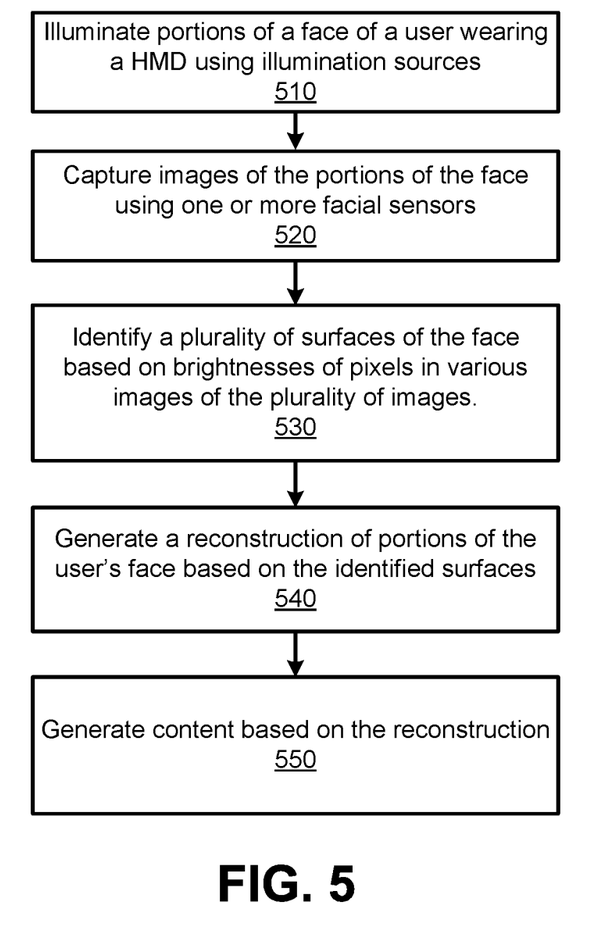
FIG. 5 is a flow chart illustrating a process of generating a reconstruction of portions of a user's face while the user wears a head mounted display, in accordance with an embodiment.

Generating Reconstructions of One or More Portions of a Face of a User Wearing a HMD FIG. 5 is a flowchart of one embodiment for generating a reconstruction of portions of a user's face while the user wears a head mounted display (HMD) 105. The process described in conjunction with FIG. 5 may be performed by the facial tracking system 160, the HMD 105, the VR console 110, or another system in various embodiments. Other entities perform some or all of the steps of the process in other embodiments. Embodiments of the process may include different or additional steps than those described in conjunction with FIG. 5. Additionally, in some embodiments, steps of the process may be performed in different orders than the order described in conjunction with FIG. 5.

One or more illumination sources 200 coupled to a HMD 105 worn by the user illuminate 510 portions of the user's face by emitting light onto the portions of the user's face. In an embodiment, the facial tracking system 160 initially illuminates 510 portions of a face of a user wearing a HMD 105. For example, an illumination source 200 emits one or more wavelengths of light that illuminate 510 the user's cheek, one or more of the user's nostril, the user's chin, or another portion of the user's face that is not covered by the HMD 105.

In various embodiments, one or more facial sensors 210 capture 520 images of the portions of the user's face illuminated by the one or more illumination sources 200. For example, a facial sensor 210 is a camera configured to capture a series of images of a portion of the user's face illuminated by an illumination source 200. As further described above in conjunction with FIG. 2, the controller 220 of the facial tracking system 160 identifies 530 surfaces of the portions of the user's face from the captured images. In various embodiments, the controller 220 identifies a pixel in each captured image having a maximum brightness and identifies 530 one or more surfaces of portions of the user's face based on the pixel with the maximum brightness in each of the captured images. For example, a surface of a portion of the user's face is represented by a two-dimensional (2D) or three-dimensional (3D) coordinate point or plane. As an example, a 2D coordinate of a tip of the user's nose is a surface. In another example, a surface is a 3D plane representing the user's cheek is a surface; a 3D point of the plane representing the user's cheek that corresponds to a pixel of a captured image of the user's cheek having a maximum brightness identifies a point of the cheek protruding farthest from the user's face because the point reflects the greatest amount of light from an illumination source 200 illuminating the user's face. As described above in conjunction with FIG. 2, the controller may identify landmarks of portions of the user's face when identifying 530 the surfaces of the portions of the user's face.

Based on the identified surfaces, the controller 220 generates 540 a reconstruction of the user's face. In various embodiments, the reconstruction is a 2D representation of the user's face, while in other embodiments the reconstruction is a 3D representation of the user's face. As described above in conjunction with FIG. 2, the controller 220 generates 540 a reconstruction of a portion of the user's face based on mappings between coordinates of pixels in various images with landmarks of the user's face and interpolating data between sections of a surface of the portion of the user's face corresponding to stored mappings. The controller 220 generates 550 content based on the reconstruction, such as instructions for displaying the reconstruction, and provides the content to an electronic display 115 of the HMD 105 for presentation to the user, or the controller 220 provides the reconstruction to a VR console 110 providing content to the HMD 105, and the VR console 110 generates 550 content based on the reconstruction for presentation to the user by the HMD 105. Additionally, the controller 220 may store the reconstruction in a storage device or communicate the reconstruction to the VR console 110 or to another entity that stores the reconstruction for subsequent use. In some embodiments, the reconstruction is assessable to other users of a system environment 100 including the HMD 105 or may be accessed by system environments 100 including other HMDs 105.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A head mounted display (HMD) comprising:
    a rigid body including display element configured to display content to a user wearing the HMD and an optics block configured to direct light from the display element to an exit pupil of the HMD;
    one or more illumination sources coupled to a surface of the rigid body and configured illuminate portions of a face of the user that are external to the rigid body;
    one or more image capture devices coupled to the surface of the rigid body and configured to capture one or more images of one or more portions of the face of the user external to the rigid body that are illuminated by the one or more illumination sources; and
    a controller configured to receive one or more captured images from the one or more image capture devices and to generate a reconstruction of a portion of the face of the user from the one or more captured images by:
        identifying a pixel having a maximum brightness in each of the captured images;
        identifying a section of the portion of the face of the user based on the identified pixel;
        retrieving a mapping of coordinates of pixels in the one or more captured images to one or more landmarks of the identified section of the portion of the face of the user, the mapping stored by the controller; and
        generating the reconstruction of the identified section of the portion of the face of the user based on the retrieved mapping.

2. The HMD of claim 1, wherein the controller is further configured to:
    provide instructions to the user to perform one or more facial expressions at different time intervals;
    receive one or more images from the one or more image capture devices captured during the different time intervals, images captured during a time interval corresponding to a facial expression the user was instructed to perform during the time interval;
    identify one or more landmarks of the face of the user based on images captured during time intervals corresponding to different facial expressions the user was instructed to perform; and
    generate the reconstruction of the portion of the face of the user based on the one or more landmarks and the one or more captured images.

3. The HMD of claim 1, wherein an image capture device comprises an infrared camera.

4. The HMD of claim 3, wherein the one or more illumination sources are configured to emit infrared light.

5. The HMD of claim 1, wherein the surface of the rigid body comprises a bottom side of the HMD.

6. The HMD of claim 1, wherein the controller is further configured to generate content based on the reconstruction and provide the content to the electronic display, such as instructions for displaying the reconstruction, and provides the content to the display element for presentation to the user.

7. The HMD of claim 1, wherein the controller is further configured to communicate the reconstruction to a virtual reality console that generates content based on the reconstruction and the display element is configured to receive the generated content from the virtual reality console and to present the generated content to the user.

8. The HMD of claim 1, wherein the controller is further configured to store the reconstruction in association with an identifier of the user.

9. A head mounted display (HMD) comprising:
    a rigid body including display element configured to display content to a user wearing the HMD and an optics block configured to direct light from the display element to an exit pupil of the HMD;
    one or more illumination sources coupled to a surface of the rigid body and configured illuminate portions of a face of the user that are external to the rigid body;
    one or more facial sensors, including one or more image capture devices, coupled to the surface of the rigid body and configured to capture characteristics of one or more portions of the face of the user external to the rigid body that are illuminated by the one or more illumination sources; and
    a controller configured to receive the captured characteristics from the one or more facial sensors and to generate a reconstruction of a portion of the face of the user from the one or more captured characteristics by:
        identifying a pixel having a maximum brightness in an image captured by an image capture device;
        identifying a section of the portion of the face of the user based on the identified pixel;
        retrieving a mapping of coordinates of pixels in the one or more captured images to one or more landmarks of the identified section of the portion of the face of the user, the mapping stored by the controller; and
        generating the reconstruction of the identified section of the portion of the face of the user based on the retrieved mapping.

10. The HMD of claim 9, wherein the one or more facial sensors include one or more non-optical sensors.

11. The HMD of claim 10, wherein a non-optical sensor is selected from a group consisting of: an audio sensor, a strain gauge, an electric sensor, a magnetic sensor, a proximity sensor, and any combination thereof.

12. The HMD of claim 9, wherein the controller is further configured to:
provide instructions to the user to perform one or more facial expressions at different time intervals;
receive characteristics captured by the one or more facial sensors during the different time intervals, characteristics captured during a time interval corresponding to a facial expression the user was instructed to perform during the time interval;
identify one or more landmarks of the face of the user based at least in part on one or more characteristics corresponding to facial expression the user was instructed to perform during different time intervals; and
generate the reconstruction of the portion of the face of the user based on the one or more landmarks and the captured characteristics.

13. The HMD of claim 9, wherein an image capture device comprises an infrared camera.

14. The HMD of claim 13, wherein the one or more illumination sources are configured to emit infrared light.

15. The HMD of claim 9, wherein the controller is further configured to generate content based on the reconstruction and provide the content to the electronic display, such as instructions for displaying the reconstruction, and provides the content to the display element for presentation to the user.

16. The HMD of claim 9, wherein the controller is further configured to communicate the reconstruction to a virtual reality console that generates content based on the reconstruction and the display element is configured to receive the generated content from the virtual reality console and to present the generated content to the user.

17. A method comprising:
illuminating a portion of a face of a user wearing a head mounted display (HMD) external to the HMD using one or more illumination sources coupled to one or more surfaces of the HMD;
capturing images of the portion of the face illuminated by the one or more illumination sources;
identifying a pixel having a maximum brightness in each of the captured images;
generating mappings between the identified pixel each of the captured images and a surface of the portion of the face of the user;
generating the reconstruction of the portion of the face of the user based on the mappings; and
providing content based on the generated reconstruction for presentation to the user via the HMD.

* * * * *